United States Patent
Johnson et al.

(10) Patent No.: US 10,897,962 B2
(45) Date of Patent: Jan. 26, 2021

(54) SYSTEM AND METHOD FOR FORMING AN ARTICLE

(71) Applicant: NIKE, Inc., Beaverton, OR (US)

(72) Inventors: Daniel A. Johnson, Beaverton, OR (US); Yung-Tsung Tseng, Douliu (TW)

(73) Assignee: NIKE, Inc., Beaverton, OR (US)

( * ) Notice: Subject to any disclaimer, the term of this patent is extended or adjusted under 35 U.S.C. 154(b) by 370 days.

(21) Appl. No.: 15/444,642

(22) Filed: Feb. 28, 2017

(65) Prior Publication Data
US 2017/0164692 A1    Jun. 15, 2017

Related U.S. Application Data

(63) Continuation of application No. 13/773,729, filed on Feb. 22, 2013, now Pat. No. 9,585,438.

(51) Int. Cl.
| | |
|---|---|
| *A43D 15/00* | (2006.01) |
| *A43D 3/02* | (2006.01) |
| *B29D 35/12* | (2010.01) |
| *B29D 35/14* | (2010.01) |
| *A43D 25/07* | (2006.01) |

(52) U.S. Cl.
CPC ............. *A43D 3/02* (2013.01); *A43D 25/07* (2013.01); *B29D 35/126* (2013.01); *B29D 35/146* (2013.01)

(58) Field of Classification Search
CPC .... A43D 23/00; A43D 23/022; A43D 23/025; A43D 25/18; A43D 25/00; A47L 23/205; B29D 35/04; B29D 35/146; B29D 35/148; B29D 35/0027

USPC .................... 12/7, 4.2, 8.1, 107 R
See application file for complete search history.

(56) References Cited

U.S. PATENT DOCUMENTS

| | | | | |
|---|---|---|---|---|
| 1,365,267 | A | * | 1/1921 | Oakley .............. B29D 35/0036 264/244 |
| 1,592,722 | A | * | 7/1926 | Carter ...................... A43D 3/02 12/133 M |
| 1,703,614 | A | * | 2/1929 | De Witt ................... A43D 3/02 434/397 |

(Continued)

FOREIGN PATENT DOCUMENTS

| | | |
|---|---|---|
| CH | 285223 A | 8/1952 |
| CH | 616094 A5 | 3/1980 |

(Continued)

OTHER PUBLICATIONS

Nov. 11, 2018—(EP) ESR—App. No. 18187163.3.

(Continued)

*Primary Examiner* — Sally Haden
*Assistant Examiner* — Jullian K Pierorazio
(74) *Attorney, Agent, or Firm* — Banner & Witcoff, Ltd.

(57) ABSTRACT

A fusing system includes an upper member and a base member. The upper member includes a pressing layer and the base member is associated with a last member. The pressing layer has a contoured portion that approximates the shape of a portion of the last member. The upper member can be associated with the base portion and a vacuum can be applied so that the pressing layer is pulled down onto materials disposed on the last member for purposes of fusing the materials together to form articles, such as articles of footwear.

15 Claims, 13 Drawing Sheets

(56) References Cited

U.S. PATENT DOCUMENTS

| | | | |
|---|---|---|---|
| 1,731,024 A * | 10/1929 | Richardson | B29D 35/0036 12/1 F |
| 1,904,851 A | 4/1933 | Bresnahan | |
| 1,925,899 A * | 9/1933 | Knowland | A43D 111/003 12/1 A |
| 2,113,802 A * | 4/1938 | Valdiserri | A43D 25/06 12/39.5 |
| 2,229,085 A * | 1/1941 | Hoza | B29C 35/04 425/340 |
| 2,247,818 A * | 7/1941 | Nast | B29D 35/0027 12/133 M |
| 2,301,785 A * | 11/1942 | Marx | A43D 8/003 12/54.1 |
| 2,443,877 A * | 6/1948 | Vacin | A43D 111/00 12/1 A |
| 2,641,004 A * | 6/1953 | Ronyan | A43B 1/02 12/133 R |
| 2,878,523 A | 3/1959 | Henry | |
| 2,907,058 A | 10/1959 | Evins | |
| 2,996,739 A | 8/1961 | Vdolek | |
| 3,102,286 A * | 9/1963 | Minick | A43D 25/06 12/33.2 |
| 3,141,183 A | 7/1964 | Ralphs | |
| 3,160,899 A | 12/1964 | Bille et al. | |
| 3,349,417 A * | 10/1967 | Woodman | A43D 11/14 12/142 R |
| 3,362,091 A | 1/1968 | Drago | |
| 3,390,411 A * | 7/1968 | Benken | A43D 25/06 12/7 |
| 3,501,793 A * | 3/1970 | Jonas | A43D 3/02 12/136 R |
| 3,512,197 A * | 5/1970 | Carr, Sr. | A43D 21/10 12/1 W |
| 3,803,655 A | 4/1974 | White et al. | |
| 3,855,657 A | 12/1974 | Mazzotta | |
| 3,938,211 A | 2/1976 | Armstrong | |
| 4,028,764 A | 6/1977 | Wilms et al. | |
| 4,266,312 A | 5/1981 | Hall | |
| 4,290,838 A | 9/1981 | Reavill et al. | |
| 4,660,242 A | 4/1987 | Vomberger et al. | |
| 4,964,229 A | 10/1990 | Laberge | |
| 5,108,532 A | 4/1992 | Thein et al. | |
| 5,129,813 A | 7/1992 | Shepherd | |
| 5,275,775 A | 1/1994 | Riecken | |
| 5,296,182 A | 3/1994 | Thary | |
| 5,885,500 A | 3/1999 | Tawney et al. | |
| 5,940,991 A | 8/1999 | Cabalquinto | |
| 6,007,748 A | 12/1999 | Krajcir | |
| 6,295,679 B1 | 10/2001 | Chenevert | |
| 6,299,817 B1 | 10/2001 | Parkinson | |
| 6,622,332 B2 * | 9/2003 | Furuhashi | A43D 3/022 12/142 R |
| 6,670,029 B2 | 12/2003 | Norton et al. | |
| 6,805,825 B1 | 10/2004 | MacLeod | |
| 7,247,264 B2 | 7/2007 | Buchler et al. | |
| 7,430,816 B1 * | 10/2008 | Lozenski | A47L 23/205 34/104 |
| 8,029,721 B2 | 10/2011 | Waatti | |
| 8,162,022 B2 | 4/2012 | Hull et al. | |
| 2008/0028544 A1 | 2/2008 | Park | |
| 2008/0053609 A1 | 3/2008 | Renz | |
| 2008/0127426 A1 | 6/2008 | Morlacchi et al. | |
| 2008/0141469 A1 | 6/2008 | Park | |
| 2008/0250668 A1 | 10/2008 | Marvin et al. | |
| 2009/0250843 A1 * | 10/2009 | Waatti | B29C 33/02 264/404 |
| 2010/0051195 A1 | 3/2010 | Damm | |
| 2010/0139853 A1 | 6/2010 | Park | |
| 2010/0275393 A1 | 11/2010 | Jou et al. | |
| 2010/0326591 A1 | 12/2010 | Langvin et al. | |
| 2011/0088282 A1 | 4/2011 | Dojan et al. | |
| 2012/0084999 A1 | 4/2012 | Davis et al. | |
| 2012/0102782 A1 | 5/2012 | Swigart et al. | |
| 2014/0237853 A1 | 8/2014 | Fisher et al. | |
| 2014/0239556 A1 | 8/2014 | Fisher et al. | |

FOREIGN PATENT DOCUMENTS

| | | |
|---|---|---|
| CN | 2368328 Y | 3/2000 |
| CN | 1655701 A | 8/2005 |
| CN | 200944888 Y | 9/2007 |
| EP | 0264896 A1 | 4/1988 |
| EP | 0264898 A2 | 4/1988 |
| EP | 586360 A1 | 3/1994 |
| FR | 2562770 A1 | 10/1985 |
| GB | 443696 A | 3/1936 |
| GB | 494885 A | 11/1938 |
| JP | 0557786 | 3/1993 |
| JP | 9207149 | 8/1997 |
| JP | 2004105323 A | 4/2004 |
| KR | 200220813 Y1 | 2/2001 |
| NL | 7714472 A | 7/1979 |
| WO | 9003744 A1 | 4/1990 |
| WO | 0211571 A1 | 2/2002 |
| WO | D2067712 A1 | 9/2002 |
| WO | 2004112525 A1 | 12/2004 |
| WO | 2011082275 A1 | 7/2011 |

OTHER PUBLICATIONS

Sep. 8, 2014—(WO) ISR and Written Opinion—App. No. PCT/US2014/017240.
Sep. 3, 2015—(WO) IPRP and Written Opinion—App. No. PCT/US2014/017242.
Sep. 3, 2015—(WO) IPRP and Written Opinion—App. No. PCT/US2014/017239.
Sep. 3, 2015—(WO) IPRP and Written Opinion—App. No. PCT/US2014/017240.
Feb. 14, 2017—(KR) Office Action—App. No. 10-2015-7022999, with English translation.
Jun. 23, 2016—(CN) First Office Action—App. No. CN201480009590.2, with English translation.

* cited by examiner

SYSTEM AND METHOD FOR FORMING AN ARTICLE

CROSS-REFERENCE TO RELATED APPLICATION

This application is a continuation of U.S. patent application Ser. No. 13/773,729, titled "System and Method For Forming An Article" and filed Feb. 22, 2013, which application is incorporated by reference herein.

BACKGROUND

The present embodiments relate generally to footwear and in particular to a method of making footwear and an associated system.

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. In addition, the upper may include a tongue that extends under the lacing system to enhance adjustability and comfort of the footwear, and the upper may incorporate a heel counter.

The sole structure is secured to a lower portion of the upper so as to be positioned between the foot and the ground. In athletic footwear, for example, the sole structure may include a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal a lower surface of the foot to enhance footwear comfort.

Various components of an article of footwear can be formed using multiple materials and/or material layers. Uppers, for example, may generally be formed by combining multiple layers, such as one or more base layers and various trim layers.

SUMMARY

In one aspect, a system for making articles of footwear includes a base member and a last member attached to the base member, the last member having the approximate geometry of a foot. The system also includes a pressing layer, where a portion of the pressing layer has a geometry that is approximately similar to the geometry of the last member. The pressing layer is configured to wrap around the last member and materials disposed on the last member when a vacuum is applied between the base member and the pressing layer.

In another aspect, a system for making articles of footwear includes a base member and a last member attached to the base member, the last member having the approximate geometry of a foot. The system also includes a pressing layer, the pressing layer including an outward surface and an inward surface disposed opposite of the outward surface. The pressing layer includes a concave portion with respect to the outward surface and the concave portion is configured to receive the last member. The pressing layer can flex when a vacuum is applied between the base member and the pressing layer.

In another aspect, a system for manufacturing articles includes an upper member including a cavity, the upper member being further associated with a pressing layer that extends into the cavity. The system also includes a base member configured to associate with the upper member, where associating the upper member with the base member provides a seal in the region between the pressing layer and the base member. The pressing layer includes a contoured portion and the pressing layer can be used to apply pressure to at least two materials that may be placed between the pressing layer and the base member.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
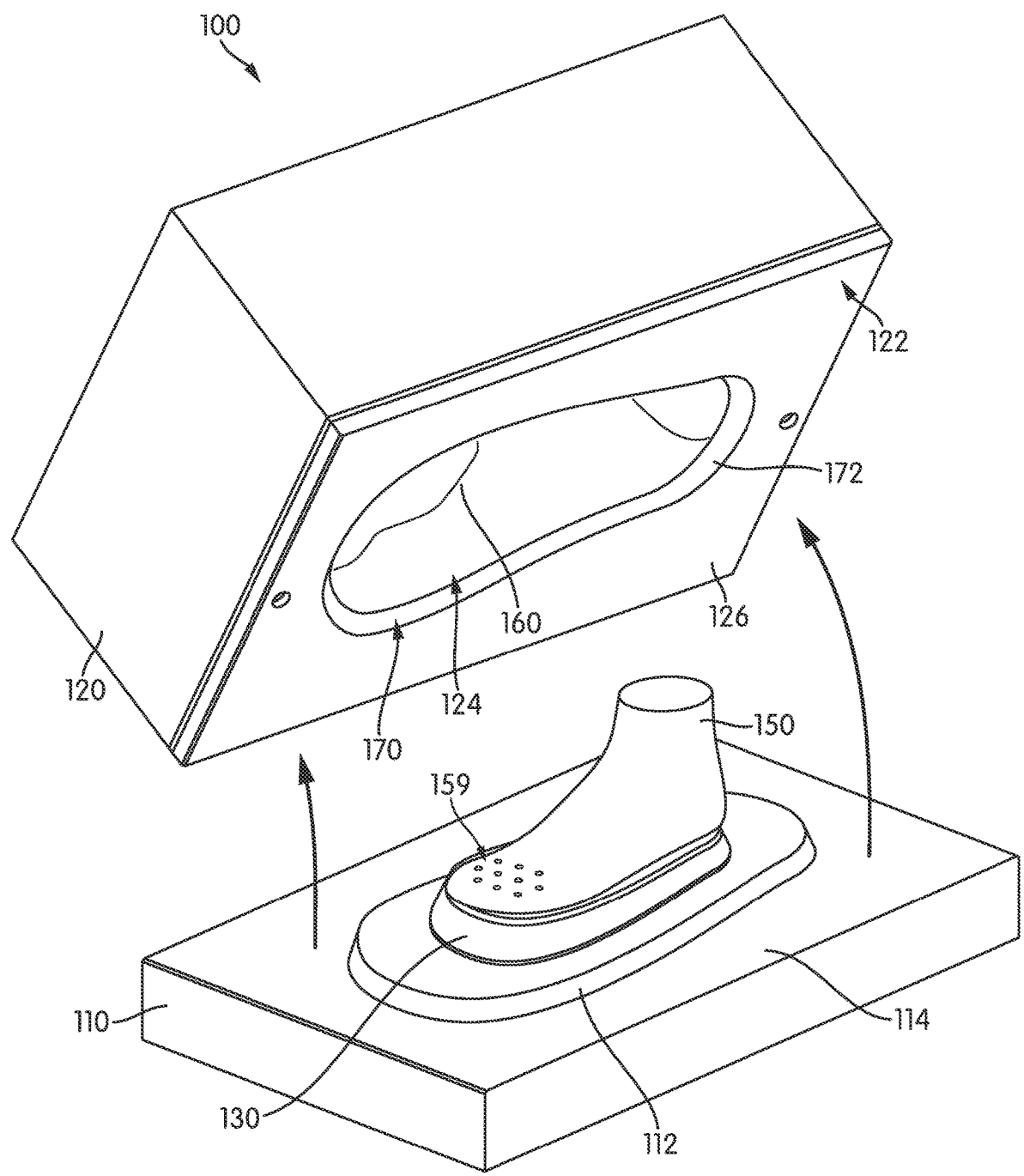
FIG. 1 is a schematic isometric view of an embodiment of a fusing system for articles of footwear.

FIG. 1 is a schematic isometric view of an embodiment of a fusing system 100. Fusing system 100 may be used to apply pressure and/or heat to materials on a three-dimensional last. In some embodiments, fusing system 100 may be intended for use with various kinds of articles including articles of footwear and/or articles of apparel. Fusing system 100 may be used for a variety of purposes, including for example, fusing two or more materials together using pressure and/or heat. One such method for fusing materials together to form portions of an article of footwear is disclosed in Berend et al., U.S. Patent Application Publication Number 2014/0237853, "Bottom Down Last for 3D Forming", the entirety of which is hereby incorporated by reference. Moreover, fusing system 100 may be used to fuse materials together while the materials are disposed on a three-dimensional form, such as a last. This allows the materials to be joined in a manner that accommodates the contours of the final three-dimensional article.

In other embodiments, fusing system 100 may have other implementations. As another example, fusing system 100 may be used to transfer graphics from a transfer layer to a portion of an article using pressure and/or heat. One such example of a graphic transfer method that uses pressure and heat is disclosed in Hull, U.S. Pat. No. 8,162,022, issued Apr. 24, 2012, the entirety of which is hereby incorporated by reference. Therefore, it will be understood that the fusing system 100 of the embodiments discussed below may be utilized for a variety of different purposes where it may be necessary to apply pressure and/or heat over portions of an article (i.e., footwear and/or apparel). Moreover, the provisions described to facilitate fusing, bonding, graphic transfer, material shaping, as well as a variety of other functions may be useful with three-dimensional/contoured as well as substantially flat articles.

For clarity, the following detailed description discusses embodiments where a fusing system is used to apply pressure and/or heat to an article of footwear. Generally, a fusing system can be used with any kinds footwear including, but not limited to: hiking boots, soccer shoes, football shoes, sneakers, rugby shoes, basketball shoes, baseball shoes, running shoes as well as other kinds of shoes. While the embodiments in the figures show a single article, it will be understood that a fusing system could be used with two or more articles, including articles that make up a pair of footwear.

A fusing system need not be limited to use with articles of footwear and the principles taught throughout this detailed description may be applied to additional articles as well. Generally, these principles could be applied to any article kinds of articles. Examples of articles that can be used with the fusing system include, but are not limited to: footwear, gloves, shirts, pants, socks, scarves, hats, jackets, as well as other articles. Other examples of articles that may be used include, but are not limited to: shin guards, knee pads, elbow pads, shoulder pads, as well as any other type of protective equipment. Additionally, in some embodiments, the article could be any other type of article, including, but not limited to: balls, bags, purses, backpacks, as well as other articles. Moreover, the article may be any article that can be worn or may be an article that is not generally worn.

As seen in FIG. 1, fusing system 100 may include a base member 110 and a corresponding upper member 120. Base member 110 generally comprises the lower part of fusing system 100, while upper member 120 may comprise the upper part of fusing system 100. As described in further detail below, base member 110 and upper member 120 may correspond in a manner that allows upper member 120 to interface with base member 110. In some embodiments, upper member 120 may interface with base member 110 in a manner that provides a fluid tight seal between the two members.

In some embodiments, base member 110 may comprise a platform like portion. In some embodiments, the geometry of base member 110 may be approximately rectangular, though in other embodiments the geometry could vary. In some embodiments, base member 110 includes a raised central portion 112, which rises from a peripheral portion 114.

In some embodiments, base member 110 may further include an interface member 130. In some embodiments, interface member 130 may be disposed on raised central portion 112. Interface member 130 may be integrally formed with base member 110 or may be separably attached to base member 110. Moreover, interface member 130 may include further provisions for connecting base member 110 and last member 150, which is discussed in further detail below.

In some embodiments, upper member 120 may comprise a block-like portion with a lower side 122 that confronts base member 110. In some embodiments, lower side 122 may further include a central cavity 124 of upper member 120 that is concave with respect to a lower peripheral surface 126. Furthermore, the size and geometry of central cavity 124 may be such that central raised portion 112 of base member 110 fits into central cavity when upper member 120 is lowered onto base member 110.

Generally, central cavity 124 can have any shape. In some embodiments, central cavity 124 may have a substantially box-like shape so that central cavity 124 has a substantially constant depth. In other embodiments, central cavity 124 could have an irregular shape. For example, in some embodiments, central cavity 124 could have a shape that corresponds approximately to the shape of a footwear last. In still other embodiments, central cavity 124 could have any other shape including, but not limited to: a rounded shape, a polyhedral shape, a regular shape, an irregular shape, a symmetric shape, an asymmetric shape as well as any other shape.

Some embodiments of upper member 120 may further include a pressing layer 160. In some embodiments, pressing layer 160 may extend across a lower region 170 of central cavity 124. In some embodiments, pressing layer 160 may extend across the entirety of central cavity. Thus, in some embodiments, pressing layer 160 may generally separate a lower opening 172 of central cavity 124 from an interior chamber 174 (see FIG. 5). In some cases, interior chamber 174 may be bound by pressing layer 160 and interior cavity walls 176 of central cavity 124 (see FIG. 5).

Figure 2:
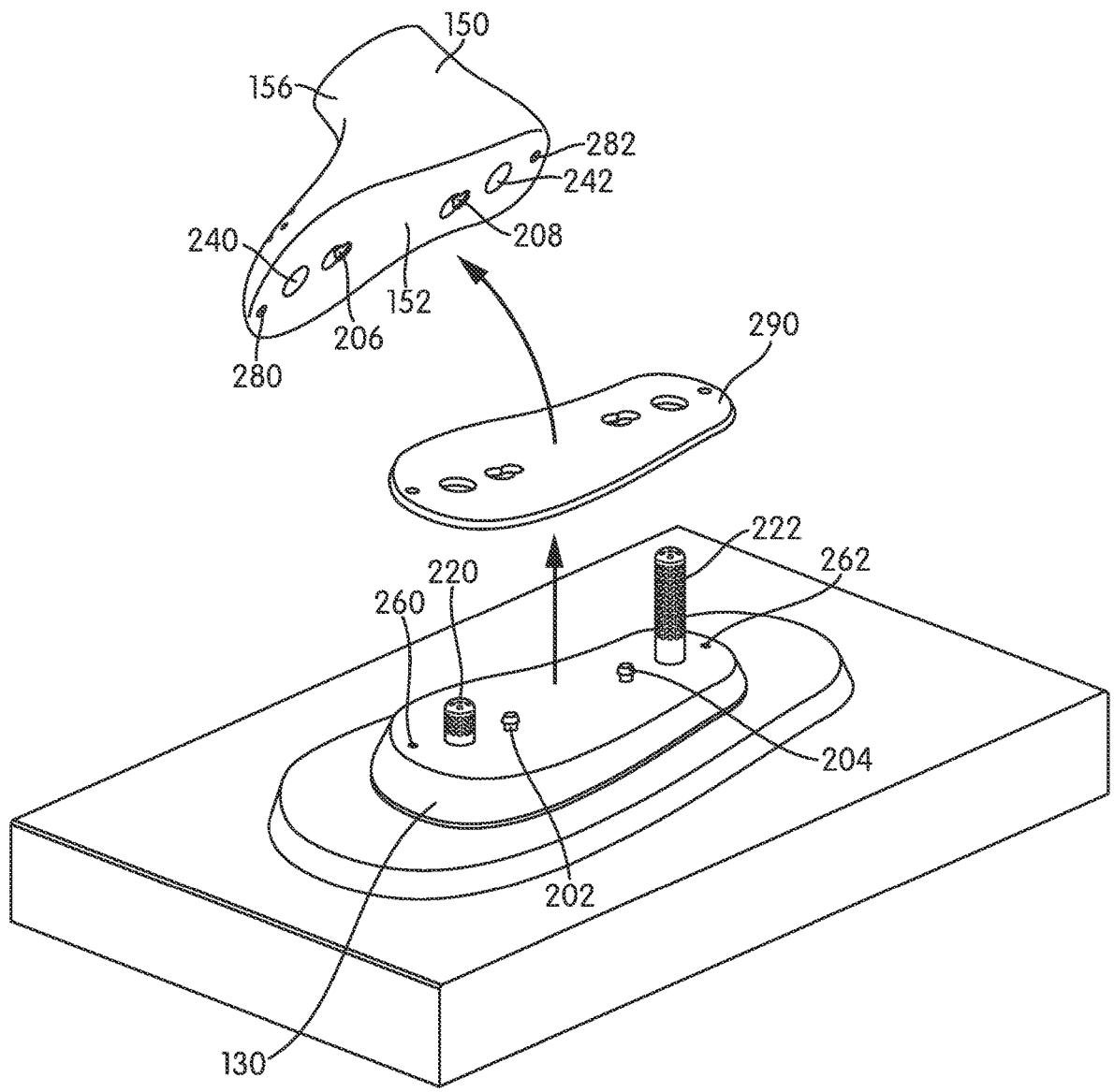
FIG. 2 is a schematic isometric exploded view of some components of a fusing system.

FIG. 2 illustrates a schematic view of an embodiment of base member 110. Referring now to FIGS. 1 and 2, fusing system 100 may be further associated with last member 150. In embodiments intended for use with articles of footwear, last member 150 may comprise a footwear last that has the approximate geometry of a foot. Last member 150 may be configured to receive portions of an article of footwear, such as a footwear upper, as well as materials used in the construction of the article of footwear (e.g., materials for making an upper). Although the current embodiment illustrates a footwear last, other embodiments could incorporate lasts for other kinds of articles including any articles described above. As an example, in an alternative embodiment, a last could have the geometry of a head (or portion of a head) to accommodate the manufacturing of hats and/or other headwear.

In different embodiments, last member 150 may include various provisions to hold materials in place and/or heat materials disposed on last member 150. In some embodiments, for example, last member 150 could include one or more airflow holes. Airflow holes may be utilized in a variety of manners, including, providing suction along the surface of last member 150 to hold portions of material in place on last member 150. Additionally, in some cases, holes could be used to circulate air from inside last member 150 to the materials along the outer surface of last member 150. Such a use of airflow holes may allow heat emanating from elements inside last member 150 to be transferred efficiently to materials on last member 150. Embodiments may use any of the systems, components, devices and/or methods as disclosed in Fisher et al., U.S. Patent Application Publication Number 2014/0223671, "Last with Retractable Pins", the entirety of which is hereby incorporated by reference and hereafter referred to as the retractable pin case. Although some embodiments may incorporate airflow holes, other embodiments may not include any airflow holes.

For purposes of illustration, the embodiment shown in FIG. 1 illustrates a plurality of airflow holes 159. In this embodiment, plurality of airflow holes 159 are localized in the toe region of last member 150. However, it will be understood that in other embodiments, airflow holes can be arranged in any pattern and/or configuration over any portion of last member 150. Other embodiments, for example, could include a substantially even distribution of airflow holes over a majority of last member 150. Others could include sets of airflow holes selectively placed in various regions to facilitate suction as well as heating and/or cooling of various sections of material.

In some embodiments, last member 150 could include provisions for mechanically holding portions of material in place. For example, some embodiments may incorporate one or more retractable pins that facilitate the alignment of material on last member 150. Moreover, the retractable pins may retract inwardly into last member 150 once a component (such as pressing layer 160) contacts the pins, thereby reducing the tendency of the pins to puncture or otherwise damage the contacting component. The embodiments can use any of the retractable pin systems and/or configurations disclosed in the retractable pin case cited above.

In some embodiments, interface member 130 may provide a means of releasably connecting last member 150 to base member 110. In some embodiments, interface member 130 may include first positioning pin 202 and second positioning pin 204. First positioning pin 202 and second positioning pin 204 may be configured to insert into first receiving slot 206 and second receiving slot 208, respectively, which are located on bottom surface 152 of last member 150. In some cases, first receiving slot 206 and second receiving slot 208 are sized and shaped so that first positioning pin 202 and second positioning pin 204 may be inserted into wider portions of first receiving slot 206 and second receiving slot 208, respectively, but may include more narrow portions that prevent the vertical release of first positioning pin 202 and second positioning pin 204. This arrangement allows last member 150 to be placed vertically down onto interface member 130 and then translated longitudinally to lock first positioning pin 202 and second positioning pin 204 in place relative to the vertical direction, thereby preventing unwanted removal of last member 150 from base member 110.

Although the current embodiment uses two positioning pins, other embodiments could use one, two, three or more than three positioning pins. Moreover, the pins could be configured in any arrangement. Moreover, in other embodiments, any other kinds of fasteners known in the art could be used to releasably secure a last member to interface member 130.

The arrangement described here allows for last members to be releasably attached to a fusing system. In some embodiments, two or more last members may be used in an interchangeable manner with a fusing system. For example, some embodiments could utilize different interchangeable last members to accommodate differences in article orientations (i.e., left/right), article sizes (i.e., size 8, size 9, size 10, etc.) and/or article styles (i.e., low-top, high-top, etc.).

In some embodiments, fusing system 100 may include one or more thermal elements. The term "thermal element" as used throughout this detailed description and in the claims refers to any component, device or system configured to change the thermal properties of a portion of fusing system 100. For example, in one embodiment, fusing system 100 comprises a first thermal element 220 and a second element 222 in the form of heating and cooling pipes. In particular, first thermal element 220 and second element 222 extend outwardly from base member 110, through interface member 130 and into last member 150. More specifically, first thermal element 220 extends through first interface hole 230 (see FIG. 5) and into first last hole 240. Likewise, second thermal element 222 extends through second interface hole 232 (see FIG. 5) and into second last hole 242. Thus, before or after last member 150 is assembled with interface member 130, first thermal element 220 and second thermal element 222 may be inserted into corresponding holes of last member 150.

In operation, first thermal element 220 and second thermal element 222 may act to heal and/or cool last member 150. In some embodiments, first thermal element 220 and second thermal element 222 are airflow pipes that facilitate the transfer of hot and/or cool air from a heating/cooling source (not shown).

In some embodiments, fusing system 100 may include provisions for creating a vacuum within last member 150 and/or in the region surrounding last member 150. In some embodiments, interface member 130 incorporates a first vacuum aperture 260 and a second vacuum aperture 262. First vacuum aperture 260 and second vacuum aperture 262 may be in fluid communication with a corresponding first vacuum channel 270 and second vacuum channel 272, respectively, of base member 110 (see FIG. 5). First vacuum channel 270 and second vacuum channel 272 may be further connect to a vacuum source (not shown), such as a vacuum pump.

In some embodiments, first vacuum aperture 260 and second vacuum aperture 262 may confront a first vacuum hole 280 and a second vacuum hole 282, respectively, disposed on bottom surface 152 of last member 150. In particular, with last member 150 in position on interface member 130, first vacuum hole 280 and second vacuum hole 282 may be in fluid communication with first vacuum aperture 260 and second vacuum aperture 262. This arrangement allows a vacuum to be generated within the hollow interior 154 (see FIG. 5) of last member 150. In particular, in embodiments utilizing one or more airflow holes (such as plurality of airflow holes 159 shown in FIG. 1) along the outer surface of last member 150, this arrangement may create an inward pressure or suction along outer surface 156 of last member 150. In some embodiments, first vacuum aperture 260 and/or second vacuum aperture 262 may be in fluid communication with the region between pressing layer 160 and base member 110, so that as a vacuum is generated, air within this region can be directly evacuated through first vacuum channel 270 and second vacuum channel 272.

In some embodiments, to facilitate the mounting of last member 150 to a fusing system, an additional layer of material may be provided between last member 150 and interface member 130. In some embodiments, fusing system 100 may further include an intermediate layer 290. In some cases, intermediate layer 290 may be a substantially thin layer of silicone. Thus, as pressing layer 160 wraps around the upper and side surfaces of last member 150, pressing layer 160 and intermediate layer 290 may act to substantially surround or enclose last member 150 (as well as materials disposed on last member 150). This arrangement may facilitate heating/cooling and/or may enhance the vacuum pressure applied around last member 150 by pressing layer 160.

Figure 3:
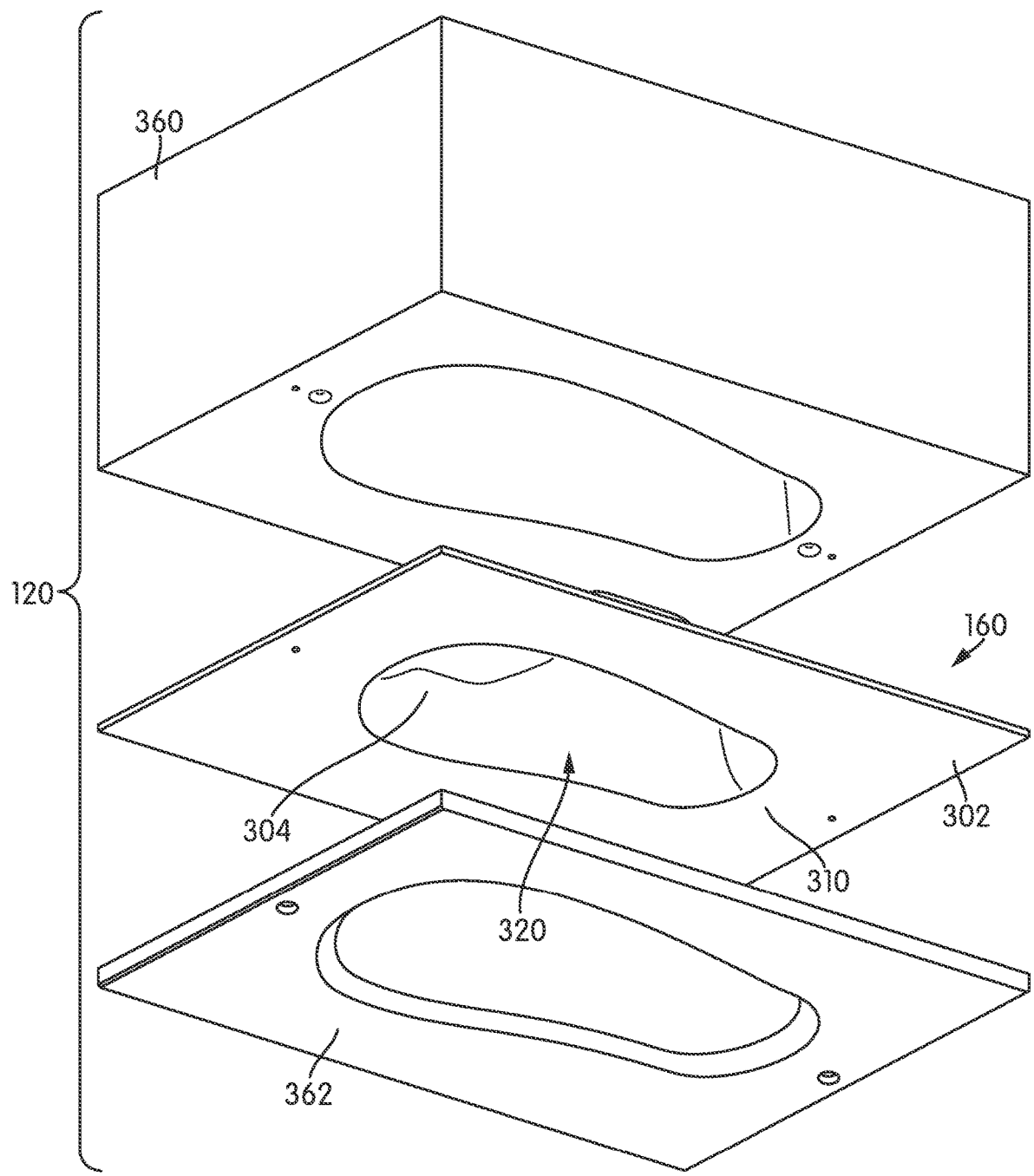
FIG. 3 is a schematic isometric exploded view of some components of an upper member of a fusing system.
Figure 4:
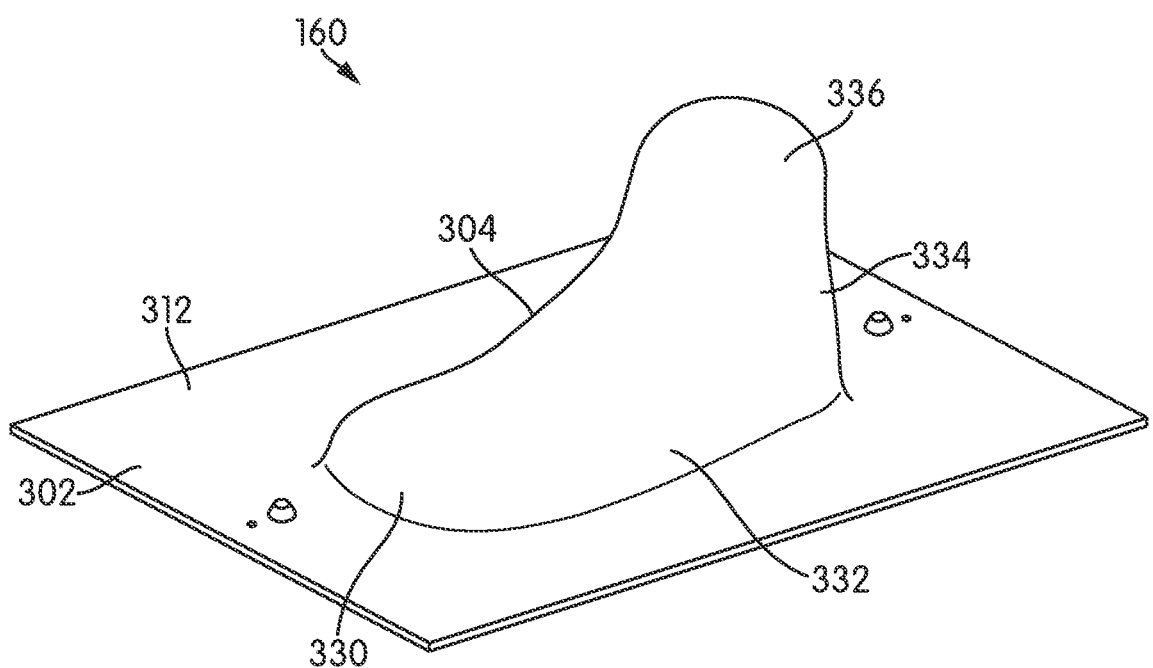
FIG. 4 is a schematic isometric view of a pressing layer for a fusing system.

FIG. 3 illustrate a schematic exploded isometric view of upper member 120 while FIG. 4 illustrates a schematic isometric top down view of pressing later 160. Referring to FIGS. 3 and 4, pressing layer 160 includes a substantially flat peripheral portion 302 and a contoured central portion 304. More specifically, the geometry of contoured central portion 304 is concave relative to an outward surface 310 (or lower surface) of pressing layer 160 (see FIG. 3) and convex relative to an inward surface 312 (or upper surface) of pressing layer 160 (see FIG. 4). In some embodiments, a cavity 320 of contoured central portion 304 is configured to receive a last member (such as last member 150).

As clearly seen in FIG. 4, contoured central portion 304 has a geometry that approximates the top of a footwear last. Contoured central portion 304 may include a forefoot portion 330, a midfoot portion 332, a heel portion 334 and an ankle portion 336, which all generally correspond to regions of a footwear last, such as last member 150. Moreover, this contoured shaped is maintained as long as pressing layer 160 is not subjected to any external forces, such as various air or other fluid pressures.

In some embodiments, pressing layer 160 may be made of a substantially flexible, elastic and/or deformable material. Thus, pressing layer 160 may be configured to stretch, bend, twist, and/or otherwise flex or deform in a manner that differs from the default geometry shown in FIG. 4. In some cases, the degree of flexibility can be selected so that pressing layer 160 can flex around last member 150 when subjected to various pressures within fusing system 100. In some embodiments, under a predetermined amount of pressure, pressing layer 160 may flex enough to conform tightly to the shape of last member 150. Moreover, as the pressure is released, pressing layer 160 may return to the default geometry once again.

In different embodiments, pressing layer 160 could comprise a variety of different materials. In some embodiments, pressing layer 160 may comprise a layer of silicone material. However, other embodiments could utilize any other materials that are substantially flexible and/or deformable. The type of material used for pressing layer 160 may be selected according to various factors including desired flexibility, desired elasticity, desired thermal conduction properties, desired durability as well as possibly other factors.

One possible means for attaching pressing layer 160 within upper member 120 is shown in FIG. 3. In this embodiment, upper member 120 may comprise a body portion 360 and a lower frame portion 362. Peripheral portion 302 of pressing layer 160 may be pressed between body portion 360 and lower frame portion 362. Moreover, the fastening of lower frame portion 362 to body portion 360 can be accomplished using any kinds of fasteners, including, but not limited to: screws, bolts, nails, rivets as well as any other kinds of fasteners known in the art.

The embodiments shown in FIGS. 3 and 4 include a pressing layer shaped to accommodate a last member of a predetermined shape. In other embodiments, however, the geometry of a pressing layer may vary to accommodate last members of different geometries. For example, lasts corresponding to high-tops and low-tops may require the use of pressing layers having corresponding geometries. Likewise, embodiments using a last for other kinds of articles (i.e., a head-shaped last for a hat or a torso-shaped last for a shirt) may require the use of pressing layers with corresponding geometries that differ from the geometries of FIGS. 3 and 4. Some other exemplary geometries are discussed in further detail below.

Figure 5:
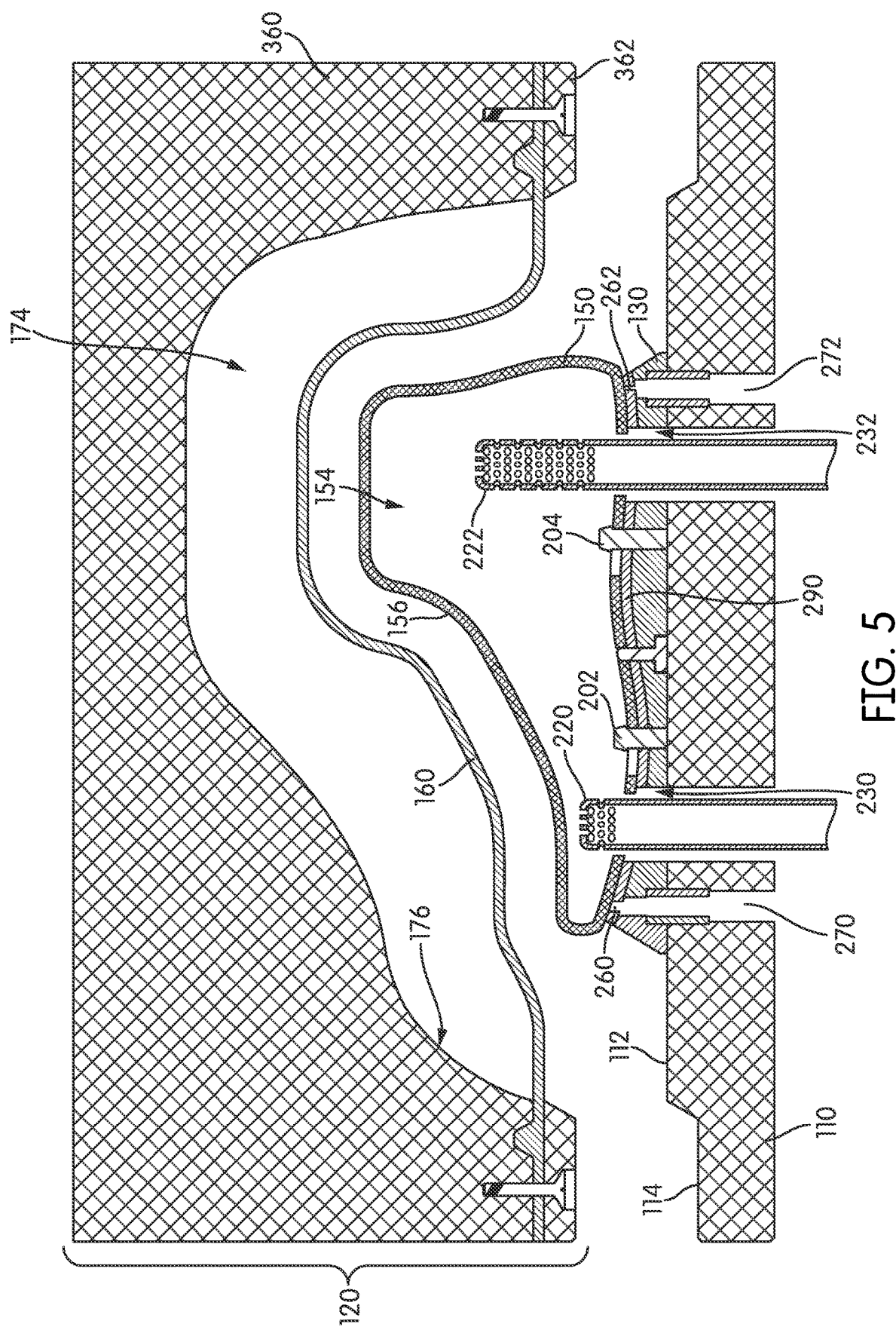
FIG. 5 is a schematic cross-sectional view of an embodiment of a fusing system.

FIG. 5 illustrates a cross-sectional view of various components of fusing system 100. Referring to FIG. 5, the similarity of the geometry of pressing layer 160 and last member 150 can be clearly seen. In particular, pressing layer 160 comprises various contours that approximately correspond with various contoured portions of last member 150. Thus, it can be clearly seen that pressing layer 160 is pre-shaped or pre-configured to associate with last member 150.

Using a pressing layer with a pre-shaped geometry may help reduce the tendency of the pressing layer to tug, pull or otherwise apply undesirable forces to material layers as the upper member is lowered to the base member. Moreover, in some cases, a pre-shaped geometry may reduce ripping, tearing or other undesired permanent deformations of the pressing layer prior to the application of the vacuum to deform the pressing layer to the last member.

FIGS. 6 through 13 illustrate an exemplary method of using fusing system 100 to form an upper for an article of footwear, in which the resulting upper is formed from at least a base layer and two trim layers. For purposes of clarity, only some possibly materials and/or layers used in the construction of an upper are shown and in other embodiments, any other materials, layers and/or other provisions could be used.

Figure 6:
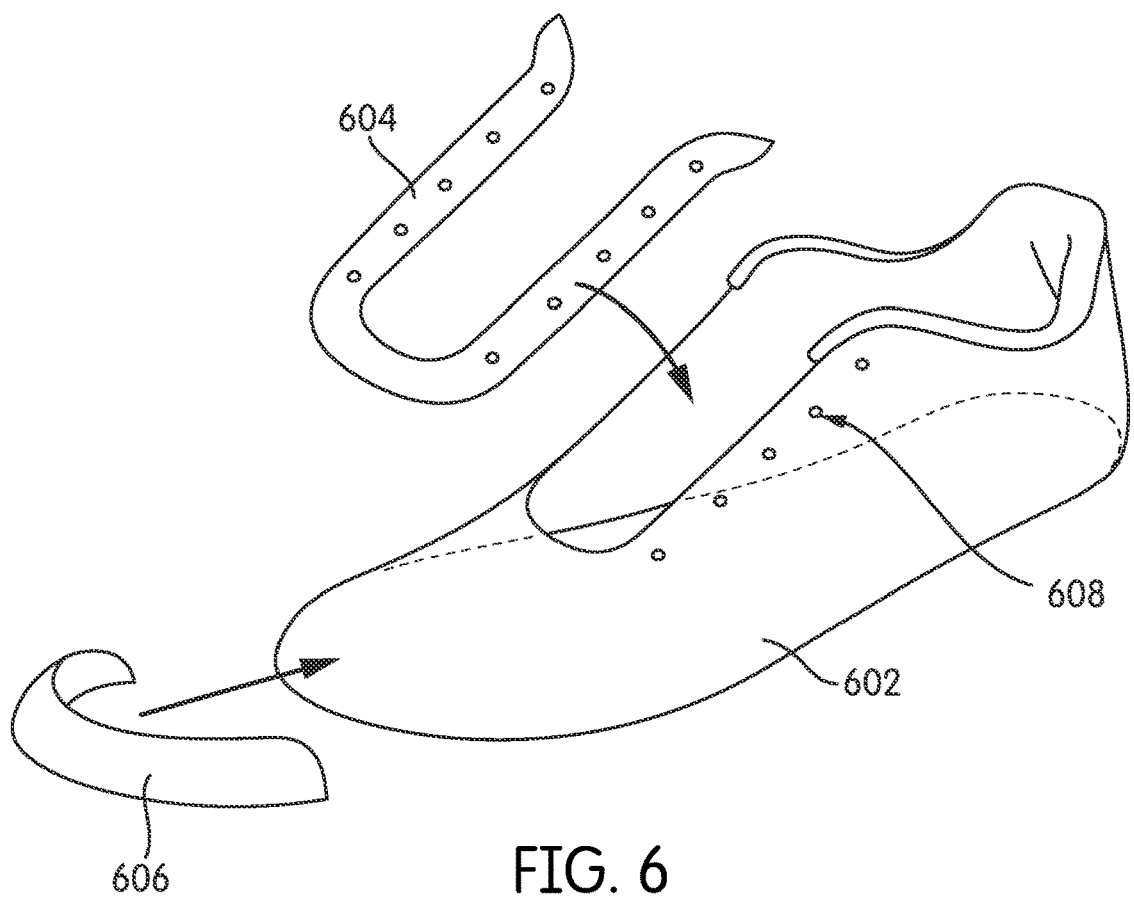
FIG. 6 is a schematic isometric view of an embodiment of various layers for an upper of an article of footwear.
Figure 7:
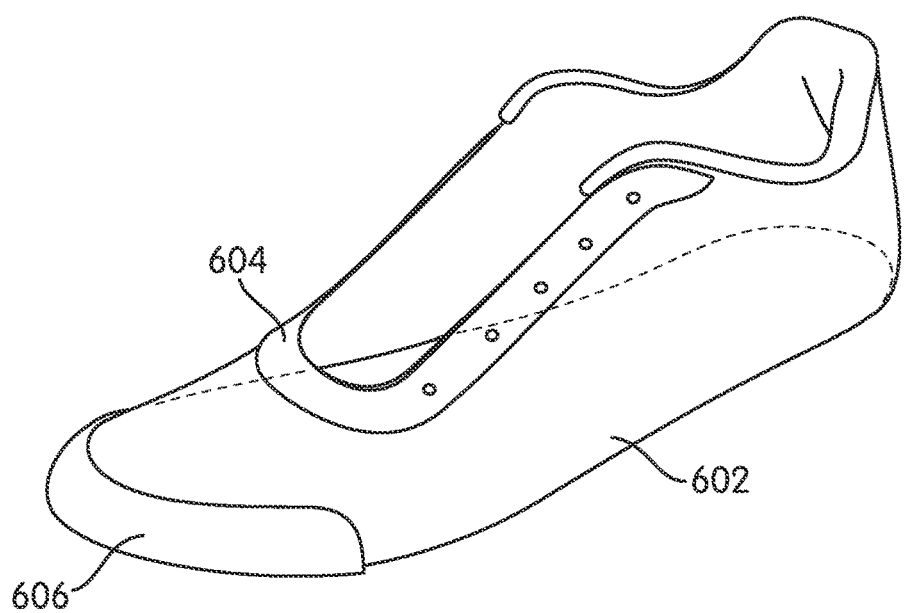
FIG. 7 is a schematic isometric view of the layers of FIG. 6 temporarily attached to one another.

FIGS. 6 and 7 illustrate schematic isometric views of materials that may be used with fusing system 100 in order to create an upper for an article of footwear. Specifically, as seen in FIGS. 6 and 7, a base layer 602 may be associated with a first trim layer 604 and a second trim layer 606. In this embodiment, first trim layer 604 may be configured to cover and/or reinforce the region associated with eyelets 608 of base layer 602. Second trim layer 606 may be associated with a toe portion of base layer 602. For purposes of illustration, two trim layers are shown here, however in other embodiments any number of layers could be used. Moreover, the layers may be trim layers, or any other kinds of layers which may improve functionality and/or modify the overall material characteristics of the resulting upper.

In order to facilitate fusing, in some embodiments, first trim layer 604 and/or second trim layer 606 may be temporarily fixed in place on base layer 602. In some cases, first trim layer 604 and/or second trim layer 606 may be temporarily attached to base layer 602 using, but not limited to, any of the following methods: temporary adhesives, welding (including ultrasonic welding), various kinds of fasteners (i.e., pins, clips, etc.), as well as possibly other provisions.

Figure 8:
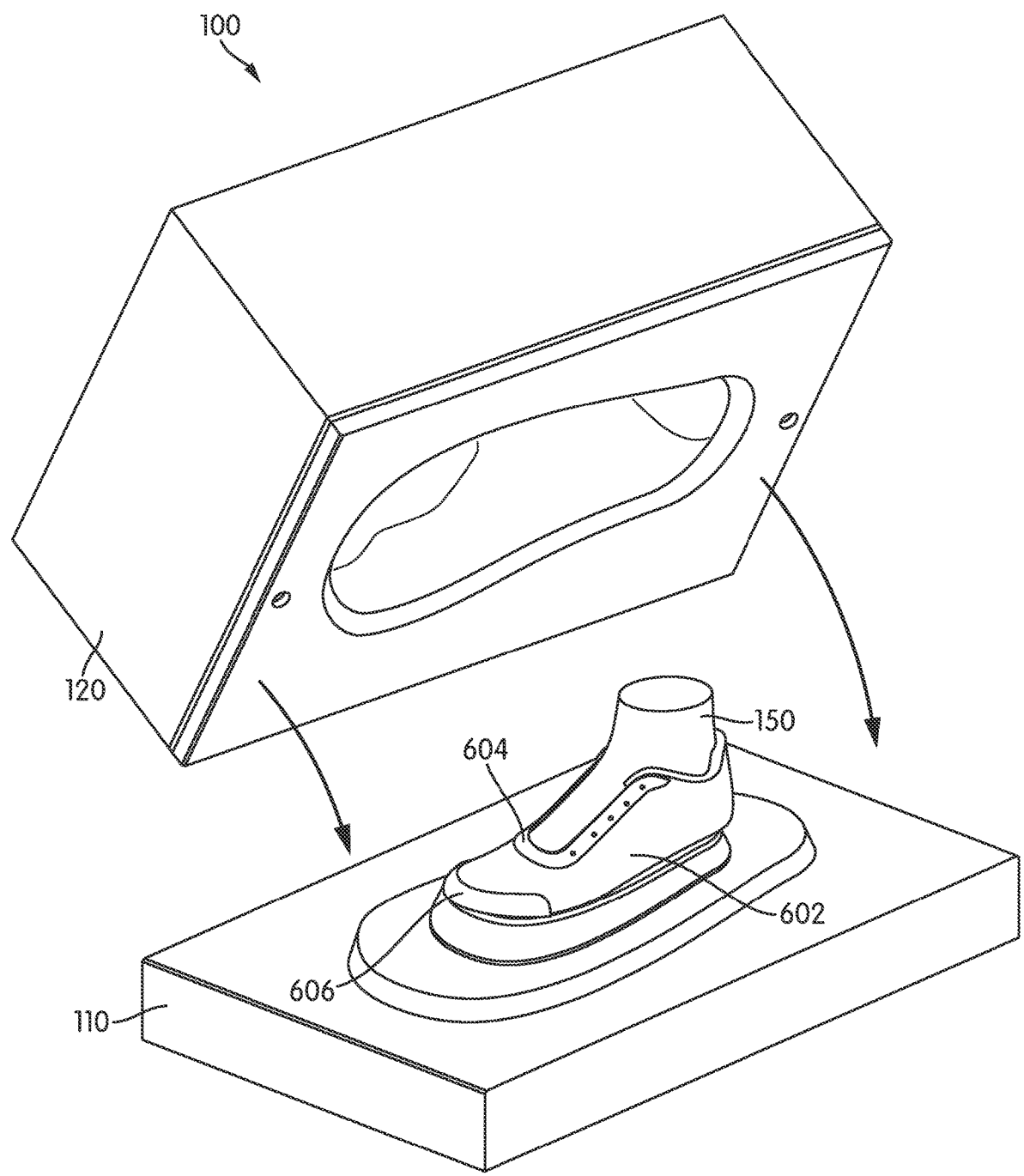
FIG. 8 is a schematic isometric view of an embodiment of an upper member being lowered onto a base member of a fusing system.

FIG. 8 illustrates a schematic isometric view of fusing system 100, in which base layer 602, first trim layer 604 and second trim layer 606 have all been placed onto last member 150. At this point, upper member 120 may be lowered onto base member 110.

Figure 9:
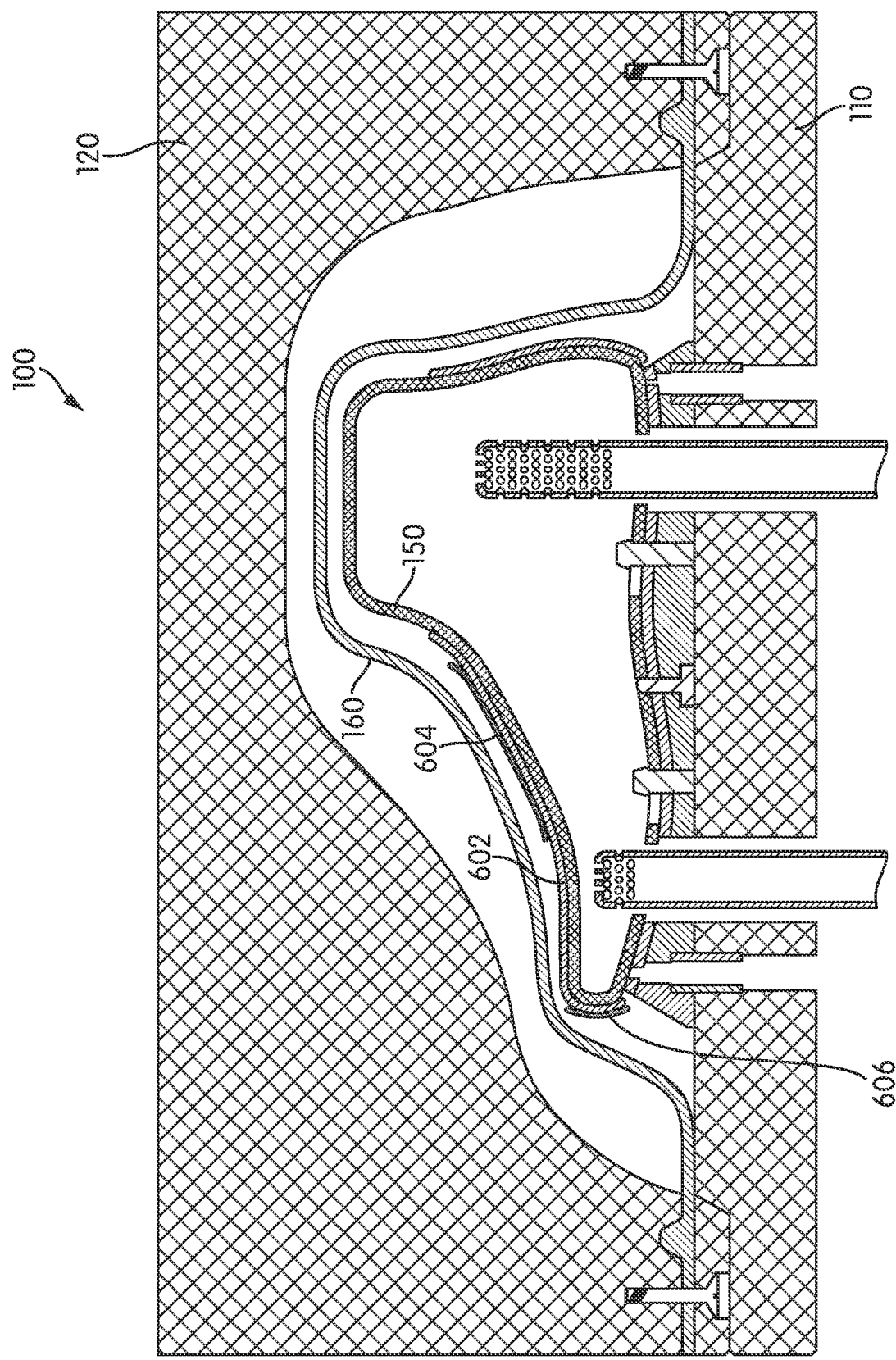
FIG. 9 is a schematic cross-sectional view of an embodiment of the fusing system of FIG. 8 once the upper member is lowered onto the base member.

FIG. 9, shows a cross-sectional view of fusing system 100 once upper member 120 has been lowered onto base member 110. In some embodiments, pressing layer 160 may initially be spaced apart from base layer 602, first trim layer 604 and second trim layer 606. In some cases, this arrangement may help reduce the tendency of pressing layer 160 to cause one or layers to be misaligned prior to the application of a vacuum. In other embodiments, pressing layer 160 may be in contact with one or more of these layers.

Figure 10:
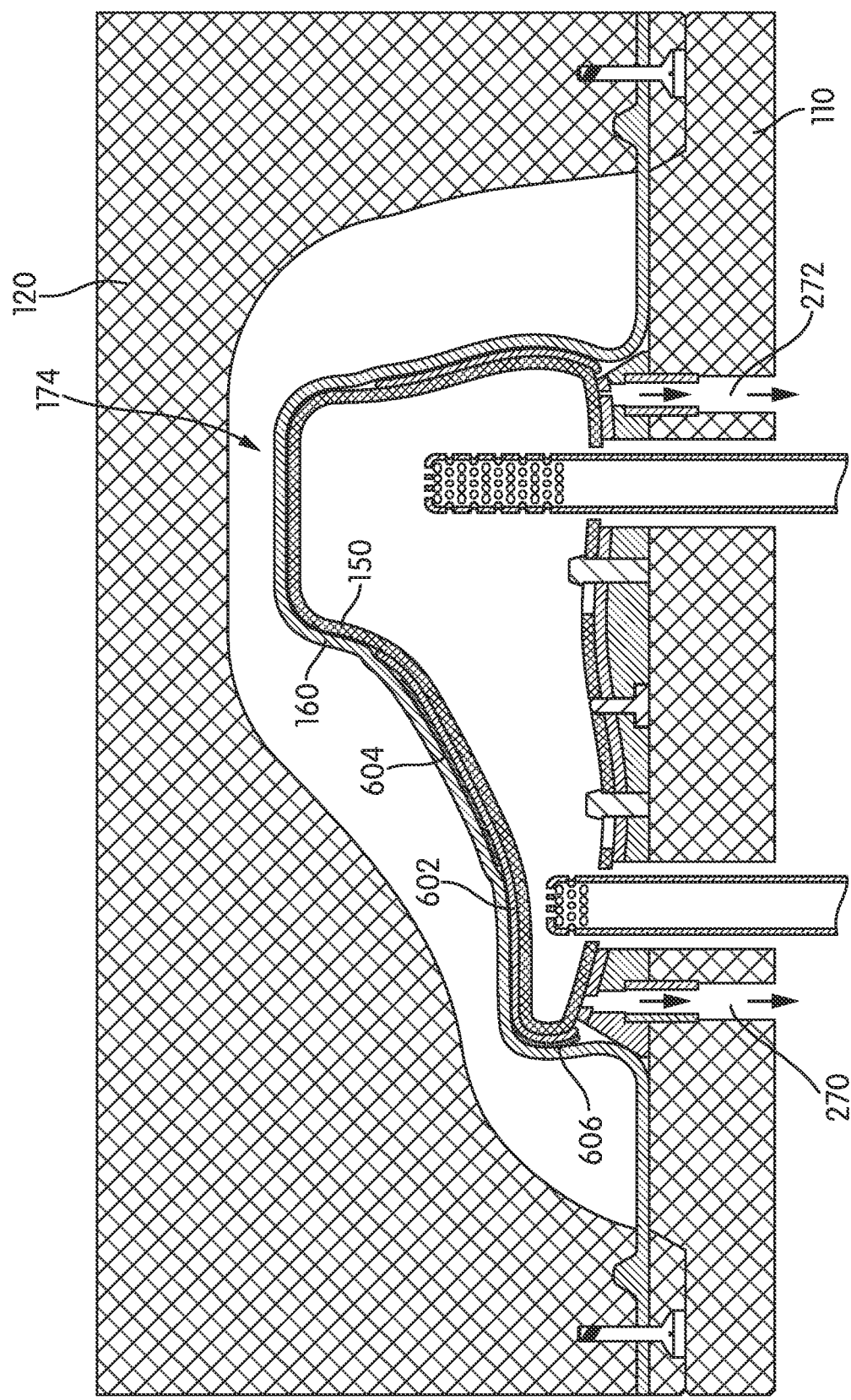
FIG. 10 is a schematic cross-sectional view of the fusing system of FIG. 9 once a vacuum has been applied between a pressing layer and the base member.
Figure 11:
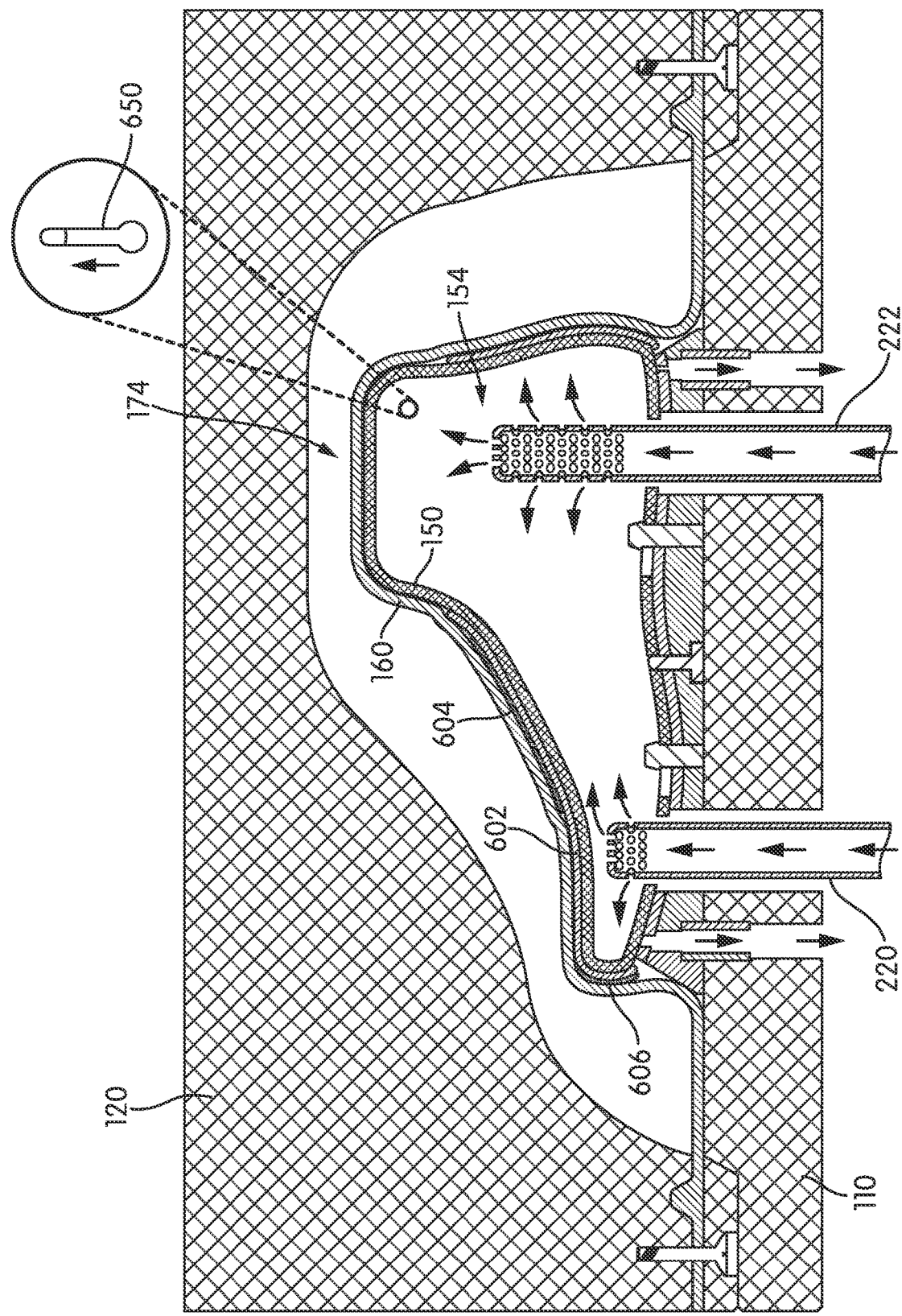
FIG. 11 is a schematic cross-sectional view of the fusing system of FIG. 10, in which heat is applied to the system.

Referring next to FIG. 10, with upper member 120 in position on base member 110, vacuum pressure can be used to pull pressing layer 160 tightly against last member 150 as well as base layer 602, first trim layer 604 and second trim layer 606. In particular, a vacuum (indicated schematically by arrows within first vacuum channel 270 and second vacuum channel 272) created between pressing layer 160 and base member 110 may cause pressing layer 160 to conform to the contours of last member 150. Moreover, as seen in FIG. 11, in some embodiments heat may also be applied using first thermal element 220 and second thermal element 222. In FIG. 11 the heating of interior 154 of last member 150 due to the inflow of hot air is indicated schematically by thermometer 650. The resulting heat and pressure may cause first trim layer 604 and second trim layer 606 to be permanently bonded, or fused, to base layer 602.

In some embodiments, the pressure of cavity 174 could also be adjusted. For example, in some cases, the pressure of cavity 174 could be increased using an external pressure source. As the pressure within cavity 174 is increased, pressing layer 160 may be further pressed against last member 150 and corresponding layers of material. Thus, in some cases, this increase in pressure in cavity 174 may increase the force with which pressing layer 160 is applied across the surface of last member 150 and the overlying materials. The embodiments may use any of the systems, devices, components and/or methods for applying external pressure forces to a flexible membrane in a cavity that are disclosed in Fisher et al., U.S. Patent Application Publication Number 20140239556, "System and Method for Applying Heat and Pressure to Three-Dimensional Articles," the entirety of the document being incorporated by reference herein.

Figure 12:
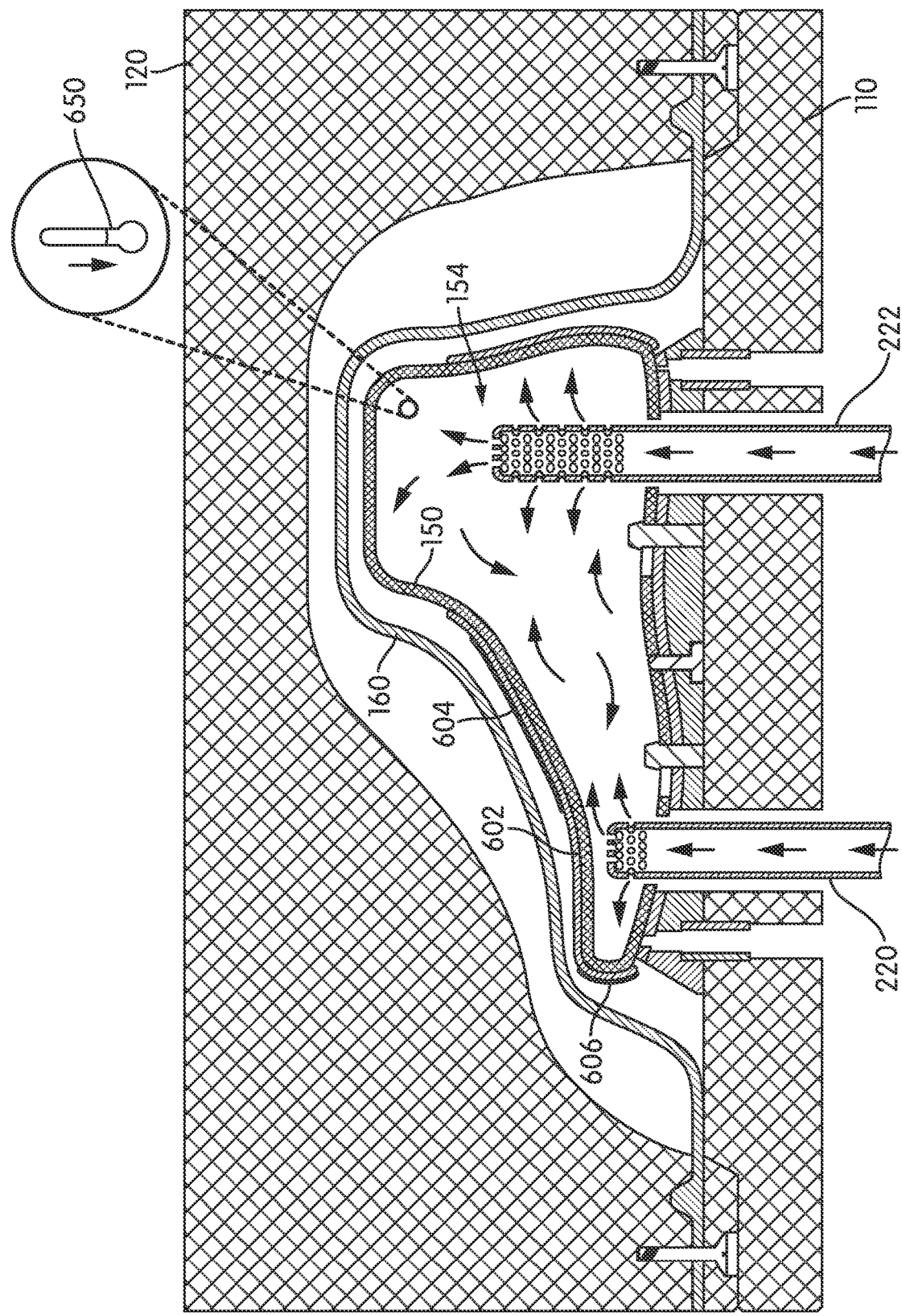
FIG. 12 is a schematic cross-sectional view of the fusing system of FIG. 9, in which the system is cooled.

In some embodiments, as seen in FIG. 12, following the application of heat and pressure, the vacuum pressure may be released so that pressing layer 160 returns to a default state (i.e., default geometry). In some embodiments, to facilitate cooling of the resulting upper, cool air can be circulated within last member 150 through first thermal element 220 and second thermal element 222. In FIG. 12, the cooling of interior 154 of last member 150 is indicated schematically by thermometer 650.

Figure 13:
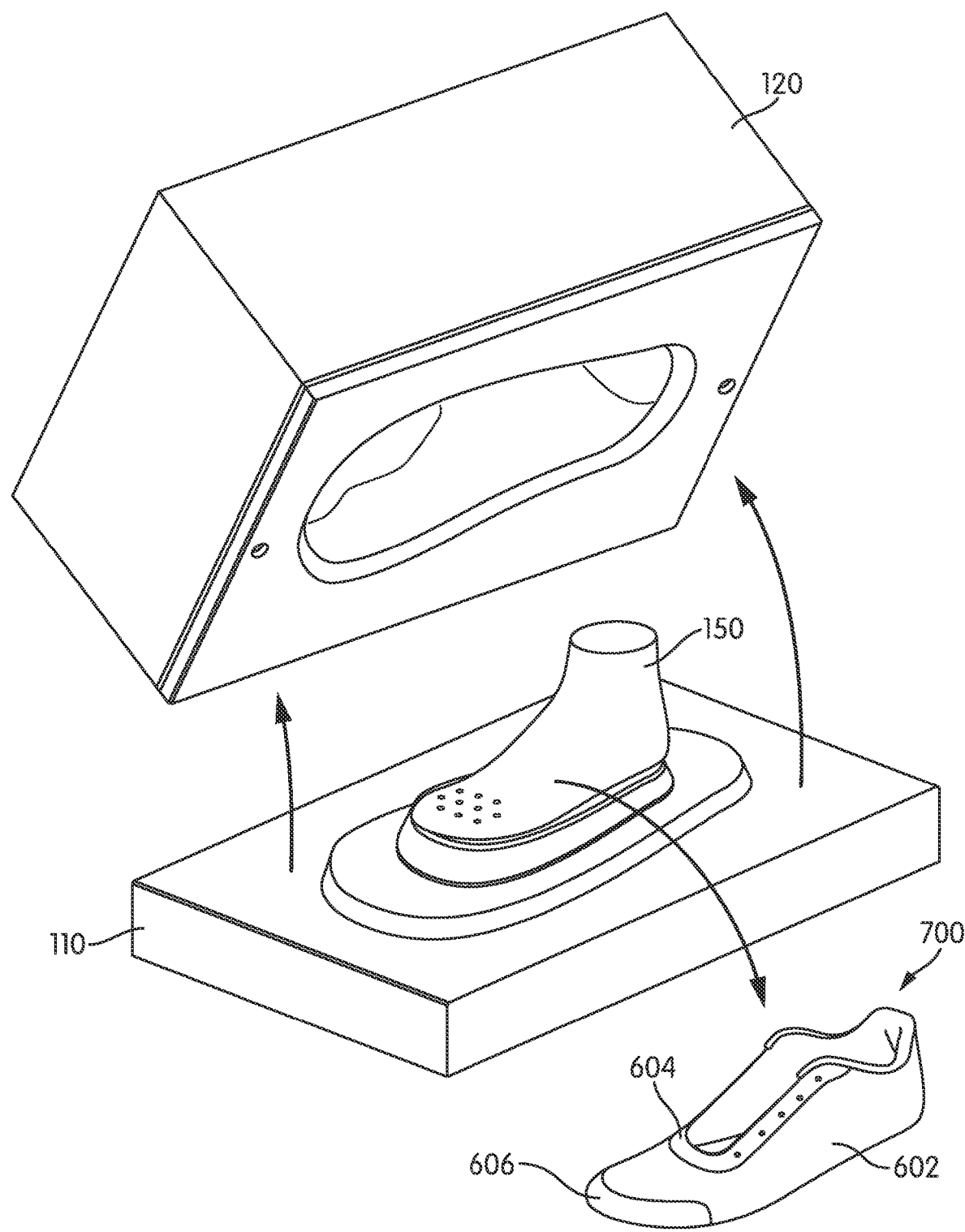
FIG. 13 is a schematic isometric view of an embodiment of a resulting upper for an article of footwear created using fusing system 100.

As seen in FIG. 13, upper member 120 may be lifted from base member 110 so that the resulting upper 700 can then be removed from last member 150. Upper 700 may comprise permanently fused layers that may remain attached under various types of stresses applied to upper 700 when upper 700 is worn. In some embodiments, upper 700 may be further associated with a sole structure or similar component in order to create a finished article of footwear.

Figure 14:
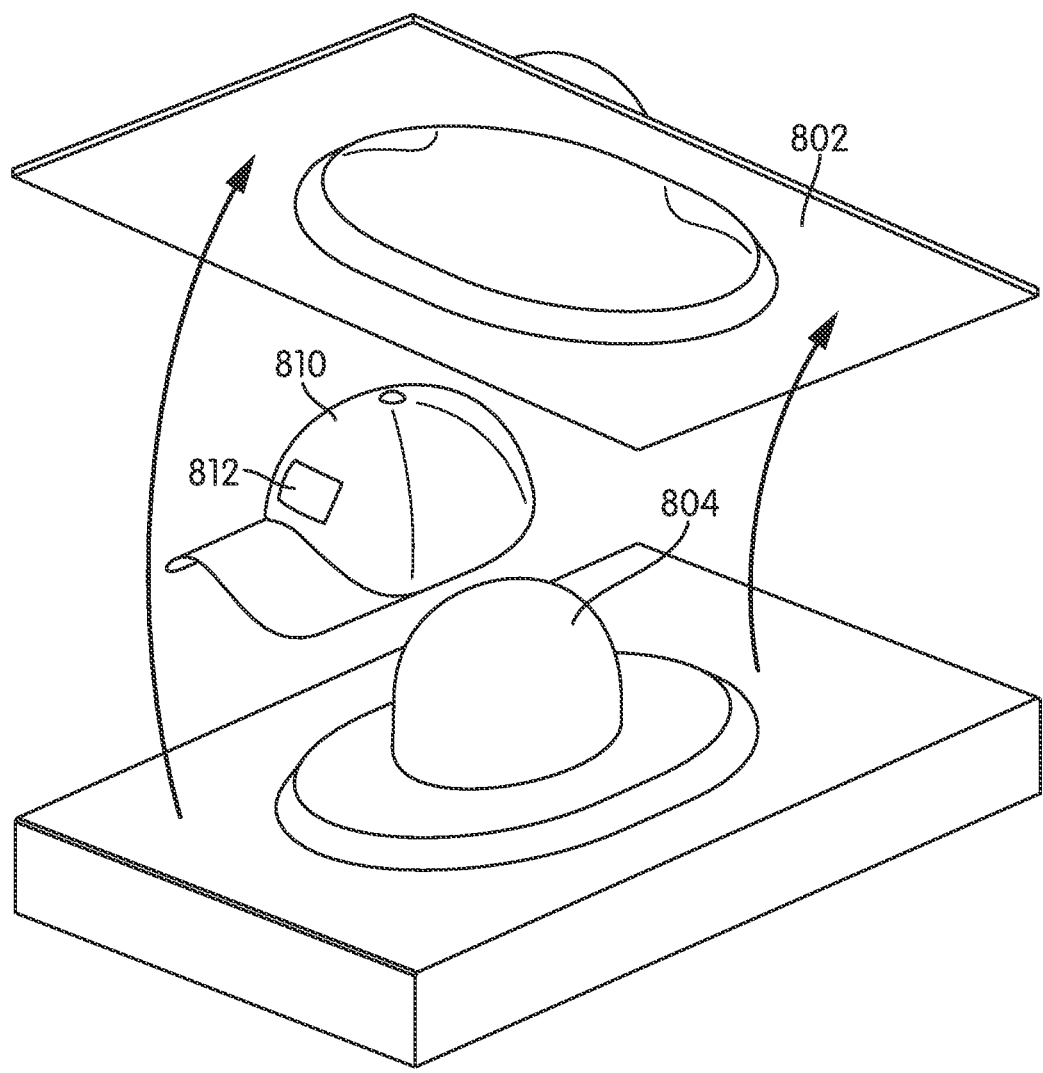
FIG. 14 is a schematic isometric view of an alternative embodiment for a fusing system configured for use in making hats.

As previously described, some embodiments could include pressing layers with different pre-defined or default geometries corresponding to different shaped lasts. FIG. 14 illustrates an alternative pressing layer geometry that may be used with a last for forming hats. Referring to FIG. 14, first pressing layer 802 may have a geometry that approximately corresponds with the geometry of last member 804, which is last for making hats. In this embodiment, for example, hat 810 may be fused with a panel of material 812 by placed hat 810 onto last member 804 and pressing it with pressing layer 802 using the previously described methods and systems.

While various embodiments of the embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A method for making articles of footwear, comprising:
   placing a base layer and at least one additional layer on a first surface of a last member, wherein the last member has a geometry of a foot and has a hollow interior;
   pulling a pressing layer against the base layer, the at least one additional layer, and the first surface of the last member by creating a vacuum between the pressing layer and the last member;
   flowing, via an airflow heating pipe, and while the pressing layer is pulled against the base layer, hot air into the hollow interior of the last member, wherein the airflow heating pipe extends into a first portion of the hollow interior; and
   removing the base layer and the at least one additional layer from the last member after the at least one additional layer has fused to the base layer.

2. The method of claim 1, wherein the last member is attached to a base member, and wherein a portion of the pressing layer has a geometry that is similar to the geometry of the last member.

3. The method of claim 2, wherein the airflow heating pipe extends outwardly from the base member and into the first portion of the hollow interior.

4. The method of claim 3, wherein a second airflow heating pipe extends outwardly from the base member and into a second portion of the hollow interior.

5. The method of claim 1, wherein the pressing layer includes a flat outer peripheral portion and a contoured central portion.

6. The method of claim 5, wherein the last member is attached to a base member, wherein the pressing layer is attached to an upper member, and wherein the upper member is lowered onto the base member.

7. The method of claim 6, wherein the upper member includes a cavity configured to receive the contoured central portion of the pressing layer.

8. The method of claim 1, wherein the last member comprises a plurality of airflow holes that provide fluid communication between the hollow interior and an outer surface of the last member.

9. The method of claim 1, wherein the last member is attached to a base member, wherein an interface member is disposed on the base member and the last member is attached to the interface member, wherein the interface member includes a first vacuum aperture that is in fluid communication with a first vacuum channel extending through the base member, and wherein creating the vacuum between the pressing layer and the last member comprises applying a vacuum through a first vacuum hole formed on a bottom surface of the last member.

10. The method of claim 9, wherein the first vacuum hole confronts the first vacuum aperture such that the first vacuum hole is in fluid communication with the first vacuum aperture.

11. The method of claim 9, wherein the interface member includes at least a first positioning pin that is inserted into a first receiving slot formed in the last member.

12. The method of claim 9, wherein the interface member includes at least a first positioning pin, and wherein the last member includes a first receiving slot formed in a bottom surface of the last member that engages the first positioning pin.

13. The method of claim 1, wherein the last member is attached to a base member, and wherein the pressing layer is disposed within an upper member, and further comprising:
    lowering the upper member onto the base member to seal a region between the pressing layer and the base member.

14. The method of claim 1, further comprising circulating cool air within the hollow interior.

15. The method of claim 1, wherein the last member is releasably attached to a base member.

\* \* \* \* \*